United States Patent [19]
Gyugyi

[11] Patent Number: 5,309,346
[45] Date of Patent: May 3, 1994

[54] TRANSMISSION LINE FAULT CURRENT DYNAMIC INVERTER CONTROL

[75] Inventor: Laszlo Gyugyi, Penn Hills Township, Allegheny County, Pa.

[73] Assignee: Westinghouse Electric Corp., Pittsburgh, Pa.

[21] Appl. No.: 760,628

[22] Filed: Sep. 16, 1991

[51] Int. Cl.$^5$ .................. H02H 7/125; H02M 1/18
[52] U.S. Cl. ........................... 363/54; 323/207; 307/102; 307/105; 361/93; 361/111
[58] Field of Search ................ 307/102, 105; 363/52–58; 361/42, 57, 59, 61, 67, 93, 111, 118; 323/207

[56] References Cited
U.S. PATENT DOCUMENTS

| | | |
|---|---|---|
| 4,697,131 | 9/1987 | Schauder et al. |
| 4,747,036 | 5/1988 | Ichikawa et al. ............ 363/54 |
| 4,757,435 | 7/1988 | Wood et al. ................. 363/54 |
| 4,805,082 | 2/1989 | Heinrich et al. |
| 4,870,557 | 8/1989 | Stacey . |
| 4,928,219 | 5/1990 | Roslund et al. ............. 363/54 |
| 5,179,510 | 1/1993 | Tokiwa et al. .............. 363/54 |

*Primary Examiner*—Emanuel T. Voeltz

[57] ABSTRACT

A fault current surge bypassing and transitional impedance compensation system for preventing subsynchronous currents on electrical power lines, with parallel lines being protected from the clearing of transient faults. Capacitor banks serve as only a partial solution to the disturbances with transient faults during conventional recovery modes of operation. The fault current bypassing and impedance compensation system, coupled in series to each transmission line, clears a transmission line fault current and dynamically balances the inductor impedance on the transmission line after the fault mode clears when a return is made to the normal mode of operation. A circuit based solid-state switching power converter or "voltage-sourced inverter" with self-commutating GTO semiconductor switches is used, having all GTOs switched-on and maintained in this condition for the fault current to pass. A parallel circuit shunting arrangement for each GTO with a reverse poled freewheeling diode provides multiple fault current paths which return to the normally switched operational GTO mode, providing a transitional return to transient and dynamic stability without fostering synchronous resonance.

10 Claims, 4 Drawing Sheets

TRANSMISSION LINE FAULT CURRENT DYNAMIC INVERTER CONTROL

CROSS-REFERENCE TO RELATED APPLICATION

The present application is related to the following concurrently filed U.S. patent application Ser. No. 07/760,627, now U.S. Pat. No. 5,198,746, by Laszlo Gyugyi and Colin D. Schauder, entitled TRANSMISSION LINE DYNAMIC IMPEDANCE COMPENSATION SYSTEM.

BACKGROUND OF THE INVENTION

This invention relates in general to electrical current bypassing systems, and more particularly, to a transmission line fault current passing system for dynamically bypassing a fault current surge on the transmission line responsive to sensing surge current conditions.

The invention is particularly applicable to a three-phase transmission line system which is operated at elevated voltage, current and other electromagnetic field parameters in order to provide efficient electric power transmission. The transmission of electric power ranges over vast easement corridors which attract the likelihood of and are subjected to prolific fault conditions at various times. These include events caused by lightning strikes, as well as other natural and unavoidable fault events, which occur in or out of operational high power consumption periods. These problematic events cause impedance changes in the respective power transmission lines which may last either momentarily or for prolonged periods of time until cleared by burn-through and physical removal.

Electrical impedance balancing circuit arrangements for transmission line systems have heretofore comprised serially connected capacitors (ofttimes referred to as series connected). A classical series circuit transmission line connection is defined with the relevant actively compensating capacitors experiencing the same current switched by a thyristor-switched capacitor arrangement. Transmission line components are rated in a voltage class, or series of classes, typically within an overall range from about 240 Kilo-Volts (KV) to about 750 KV, for the high voltage potential of the transmission line operational characteristic for this type of circuit. One of the problems has been that the capacitor banks, operated at those relatively high voltage potentials, must be each controlled by a semiconductor bypass switch or valve operated at similar potential. These switches are comprised of a circuit chain of reverse polarity, parallel circuit connected, thyristors which are operated at the high voltage potential of the transmission line.

The above-described arrangement provides relatively fast transmission line impedance control to change the degree of series impedance compensation for the transmission line. The bypass switches constituted by the thyristor pairs are each connected to a data channel that must be provided with voltage breakdown isolation between the relatively high transmission line voltage potential and a control circuit which is based at ground voltage or a relatively low reference voltage potential, and this is well below the line voltage potential magnitude. Aside from the considerable time and cost of engineering and other skills needed for the development, manufacture, installation and maintenance of the high voltage hardware suitable for the task, a capacitor switching circuit arrangement does at least partially fulfill, by cancelling a part of the inductive reactive impedance of the transmission line, the objective of increasing the power transmitting capability of the transmission line.

One of the principal problems with transmission line electrical impedance balancing circuits of this type is that the electrical resonance effect, which can occur when the inductive reactance of the transmission line and the switched-in series compensating capacitive reactance coincide with a specific frequency. This frequency is the difference between the line frequency and one of the mechanical resonant frequencies of the rotating elements of the combined generator and turbine system, and it can cause "subsynchronous resonance". This problem can be solved with the introduction of a transmission line impedance compensation system for dynamically injecting a phase quadrature AC voltage, responsive to demand, and this is the subject of U.S. Pat. No. 5,198,746, entitled TRANSMISSION LINE DYNAMIC IMPEDANCE COMPENSATION SYSTEM, assigned to the same assignee as the present invention, and it is hereby incorporated by reference into the present application.

One of the principal problems with electrical impedance balancing circuits is that they may be an ineffective way of dissipating sudden sharp or surging increase or decrease in the line current associated with the transmitted electric power. This is a problem because electrical transmission systems are frequently subjected to disturbances over a wide spectrum of severity or types. Some examples given above are line to ground or line to line faults, but other disturbances occur when large loads are being switched on and off. Other types of disturbances include the insertion or deletion of some power generators, and likewise, there is a problem when some of the parallel transmission lines are being switched on and off.

Another problem arises if the disturbance results in a sudden sharp increase or decrease in the transmitted electrical power, and this cannot be immediately matched by a change in the mechanical output power of the turbines which drive the power generators. Consequently, the generators are forced to accelerate or decelerate with the presence of oscillations, thereby affecting rotational speed and angular shaft position. This alters the amount of power transmitted even so much as to cause a temporary power shutdown in order to prevent an even more serious loss of equipment.

It is known to provide a voltage-source inverter with a fixed voltage DC link in high performance motor drive applications such as in U.S. Pat. No. 4,697,131 entitled, "Voltage Source Inverter and Variable Frequency, Constant Voltage AC Motor Drive Embodying The Same", which patent is assigned to the same assignee as the present application. This U.S. patent is hereby incorporated by reference into the present application and will be hereinafter referred to as the incorporated U.S. patent. It teaches a regeneration mode of operation in which a motor drive is reliant on diode means in preparing for recovery after a controlled power switch has interrupted the current path. The diode means also is used to bypass the controlled power switch in the forward power mode of operation of the motor drive.

The above-referred type of voltage-source inverter is used in an adaptive situation to maximize the amount of inductance inserted in a variable voltage DC-link, according to U.S. Pat. No. 4,805,082 entitled "Regenerative Two-Quadrant Converter", which is assigned to the same assignee as the present invention. Maximized inductive insertion is done by using a GTO device or a transistor to interrupt the main current so as to reduce the harmonic content thereof. It also is used to limit the rate of rise of a fault current in the event of a "shoot-through" among the thyristors of the converter bridge while in the regenerative mode. An additional static switch is thus provided for a separate bypass for the inductance energy through which to "freewheel" so as to help build up and thereby minimize the duration of a zero-current condition in the bridge at the moment of commutation.

An object of the present invention is to utilize some of the considerations from the above described voltage-source inverter and converter circuits and to apply them independently in a controllable series compensation circuit bypassing a fault current surge. Normal and fault current modes are to be for dynamically balancing the reactive impedance in a transmission line system during the normal mode and bypassing the fault current surge, respectively, when a fault current mode is inevitably sensed from surge current conditions.

SUMMARY OF THE INVENTION

In accordance with the present invention, a transmission line fault current surge passing system is provided for dynamically passing fault current. Compensating the transmission line is done by balancing a reactive impedance and dynamically injecting an AC voltage in series with the transmission line.

The fault current surge and impedance compensation system normally injects a phase quadrature AC voltage, for leading or lagging phase angles, in series with the transmission line so that the resultant phase-quadrature voltage is controllable substantially about zones defined at each of $+90$ and $-90$ electrical degrees. The injection of the phase quadrature voltage is done by a solid-state switching power converter found in a class of DC to AC converters known as "voltage source inverters", and it is operated from an energy storage capacitor.

The power converter has normal and fault current modes of operation with the latter being used for doubling the maximum normal current capability of the inverter circuit arrangement of thyristor or GTO semiconductor switches. The switches are held continuously conductive by a control means, during fault current conditions, instead of being switched at a regular rate during the time period of the fault. Each of the plurality of GTO semiconductor switches are self-commutating and each is connected across a parallel shunting circuit including a reverse poled or freewheeling diode.

Another aspect of the fault current surge and impedance compensation system is provided by the control means including feedback sensors affecting the control by sensing transmission line current to see if it exceeds first or second predetermined levels, so that if the first level of current is reached, the control means injects a predetermined amount of inductive reactance into the transmission line until the fault has cleared. But, if the second level of fault current is reached, the control means selectively initiates and maintains fault current surge removal and then transitionally reestablishes controlled compensation, with a primary control input variable phase angle $\beta$, which is the angle by which the inverter voltage vector leads the line current vector, for resumed transient and dynamic stability.

BRIEF DESCRIPTION OF THE DRAWINGS

The invention may be better understood, and further advantages and uses thereof made more readily apparent, when considered in view of the following detailed description of exemplary embodiments taken with the accompanying drawings in which.

DETAILED DESCRIPTION OF THE PREFERRED EMBODIMENTS

This invention is a new and improved transmission line impedance compensation system with a fault current mode for surge current passing and a normal mode which injects an AC voltage into the line from a voltage-source inverter. The inverter includes a controlled arrangement of GTO (Gate Turn-Off semiconductor device) switches operating from a capacitor DC voltage source with minimized real power requirements.

A three-phase electric power transmission system is implemented with the described impedance compensation system, and this is preferred for long, or very long, electric power transmission lines where the line impedance may become too high for economical power transmission to occur, even though the transmission system voltage may be chosen to be as high as 750 kV (kilo-volts). Acknowledgement has been directed, in the introductory remarks, to switching-in capacitor banks of suitable rating in series with the transmission line in order to cancel at least part of the inductive reactive impedance, as this does generally increase the power transmitting capability of a transmission line. This is done, however, at the expense of introducing a potentially significant problem called "subsynchronous resonance", which the present invention is especially suited to eliminate when transitioning from fault mode to normal mode, as well as to provide other beneficial operating stability and fault recovery modes.

The new and improved transmission line fault mode recovery impedance compensation system and method are described by illustrating only those parts of a long transmission line system pertinent to the understanding of the invention. The supplemental portions of a voltage-source inverter used in the regeneration mode of operation in a motor drive has been incorporated by reference from U.S. Pat. No. 4,697,131. Another voltage-source inverter used to maximize the amount of inductance inserted in a variable voltage DC-link with a GTO device or a transistor to interrupt the main current reducing harmonic content thereof. It is also used to limit the rate of rise of a fault current in the event of a "shoot-through" of the converter bridge while in the regenerative mode, as incorporated by reference from U.S. Pat. No. 4,805,082 as disclosed.

The implementation of these or similar voltage-source inverters into an electric power transmission line system is for the purpose of switching-on all GTOs simultaneously during fault mode recovery, as well as for injecting a quadrature (±90°) output-pole voltage from them into a coupled series circuit with the transmission line. This is for dynamically balancing the reactive impedance of the transmission line system as the goal after fault mode recovery for normal mode operation to occur so as to provide static and dynamic stability while producing enhanced efficiency of power transmission.

Voltage-Source Inverter Compensation

Figure 1:
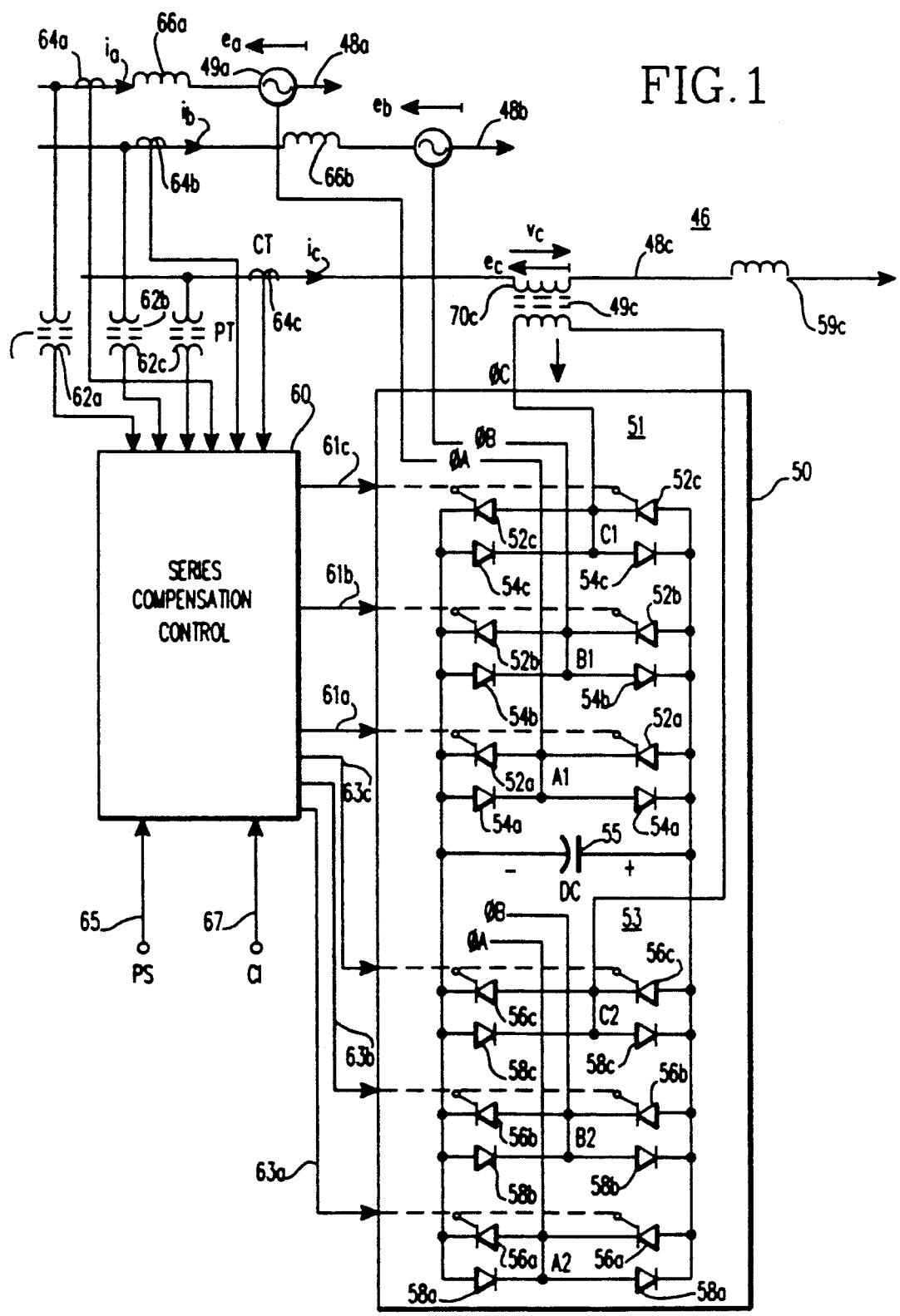
FIG. 1 is a partial block diagram and schematic circuit of a controlled voltage-source, three-phase inverter system, providing series compensation in a normal mode and fault current surge passing in a fault mode, according to the invention.

The present invention introduces a controlled inverter circuit 46 in FIG. 1, according to an expansed phase C showing for a three-phase transmission-line implementation. This is predicated on a method of and apparatus for using a voltage-source inverter circuit 50 in a manner which uniquely injects a voltage at the fundamental supply frequency (normally 60 Hertz) into the respective electric power transmission phase lines 48a, 48b, 48c. This is done in order to oppose the voltage drop $V_L$ developed across the inductive line impedance $X_L$, as at 59c in FIG. 1, which impedance is at the same fundamental frequency. The resulting voltage drop, combining $v_c$, with $V_L$, would be equivalent to that of a shorter transmission-line, a lower value of total inductance L, and a smaller value of resulting inductive reactance $X_L$. This is accomplished by the injection of an AC voltage $e_c$ which has a quadrature phase relationship with the series transmission line current $i_c$ at the fundamental supply frequency, stated for this example to be 60 Hz.

The rotating voltage phasor $v_c$ lags the likewise rotating current phasor $i_c$ by 90 electrical degrees, according to the traditional phasor analysis of AC circuit relationships according to Ohm's law. The amplitude of the injected AC voltage $e_c$ is made proportional to that of the transmission line current $i_c$ so that it is the series compensation equivalent to that obtained with a series circuit capacitor that was switched into the transmission line circuit of FIG. 1 operating at the fundamental frequency of operation of the AC system. The invention includes injecting a series compensation quadrature voltage into the transmission line and anticipates an improvement in stability with the injection of an AC voltage into each of the phases of a three-phase transmission line system with each phase being restricted to the fundamental frequency of the system. This provides superior series compensation to that obtained with capacitive series compensation. Undesired electrical resonances are obviated from the transmission line network so that subsynchronous resonance is not permitted to occur in the system.

The voltage-source inverter 50 constitutes the compensating means coupled in series with the transmission line 48c, and it includes a first compensating circuit unit 51 connected in parallel circuit with a storage voltage DC capacitor 55, with assumed polarity as indicated. This capacitor 55 is also connected in parallel circuit with a second compensating circuit unit 53 in a ladder-like configuration. The ladder elements for the first and second compensating circuit units 51, 53 are comprised of Gate Turn-Off (GTO) semiconductor switching devices 52, 56 which are capable of running at the requisite speeds for a fixed and relatively slow power frequency. Other static devices may be preferred in some other operational applications since switching speed is only one of several considerations where voltage and power rating are to be met. The choice made for pole switches is to provide rectangular waveforms which are of the type shown in FIG. 2 of incorporated-by-reference U.S. Pat. No. 4,870,557. These waveforms are characteristic for each of the first and second compensating circuit units 51, 53 which are well known in the art of harmonically neutralized high power inverters as six-pulse bridge inverter circuits. The utilization of well-known six-pulse bridge inverter circuits as modular building block components for six-pulse, twelve-pulse, and twenty-four-pulse systems provides simpler transformer arrangements.

The preferred implementation mentioned above utilizes a selected class of DC-to-AC converters termed "voltage-sourced inverters". There are various types of solid-state switching converters that can be used to generate the AC voltage required for transmission-line series compensation. The present inverter uses within the first compensating circuit unit 51, a group of six self-commutated semiconductor switches arranged in the fashion of three GTO source-pairs of thyristors 52a, 52b, 52c. Each thyristor is shunted in a parallel circuit with a reverse-parallel associated diode 54a, 54b, 54c, and this is commonly referred to as a free-wheeling diode. It functions to permit the reverse current to flow in a return path during appropriate portions of the cycle when the GTO associated with it is being switched sequentially. This provides a first set of pole output voltages A1, B1, C1 which are phase-displaced 120 electrical degrees with respect to each other in a 360-degree periodic cycle. The second compensating circuit unit 53 is similarly structured and is constituted by GTO source-pair thyristors 56a, 56b, 56c with freewheeling diodes 58a, 58b, 58c for reverse shunting in order to provide sequentially phase displaced by 120° second set of pole output voltages A2, B2, C2.

These first and second sets of pole output voltages are associatively paired with each respective phase for the coupling transformer to be energized from the first and second compensating unit pairs 51, 53 of pole output voltages. Exemplary of this for one phase of the series compensation is phase C with C1 to C2 connected across the primary winding of a series coupled transformer 70c. Coupling is through a transformer core to a secondary voltage winding 49c connected in series circuit with the transmission line phase C transmission line 48c of the electric power transmission system. Similarly phases A, B, although more abstractly shown, are the voltage source symbolic, representations 49a, 49b each in series with their respective phase transmission lines 48a, 48b. Each transformer thereby produces a series coupled compensation voltage $e_a$, $e_b$, respectively, with injection into the appropriate timing phase (displaced 120°) of operation from the voltage-source inverter circuit 50.

Power transformer phase leakage inductance 66a, 66b represents additional inductance in series with the inductance of the transmission line. The transmission line inductance 59c is shown for phase C in series with the winding inductance since this is a more complete circuit showing then the symbolic representation of voltage sources 49a, 49b in these phase lines.

The series transformer control 60 provides the switch timing appropriately from phase-sensing of the currents $i_a$, $i_b$, $i_c$, from their respective current transformers 64a, 64b, 64c. The line potential or voltage from each phase of the transmission line is sensed with potential or voltage transformers 62a, 62b, 62c which inputs to the series transformer control. Further inputs 65, 67 are respectively designated PS and CI which are acronyms representing parameter setting and control inputs. There are output control switching lines 61a, 61b, 61c for the first compensating circuit unit 51 and similarly lines 63a, 63b, 63c are for the second compensating circuit unit 53 in order to operate the respective GTO inverter switches. This is done to provide the generated voltage waveforms for the switch poles in order to provide the above-designated pole voltages and the resulting line-to-line voltages $V_{AB}$, $V_{BC}$, and $V_{CA}$. The line-to-line voltages are represented by a familiar three-level alternating step-like pattern in a proper phase sequence. These six current and voltage waveforms are mentioned but not shown in the drawings of the present disclosure since they are familiar and may be easily found in the prior art representations such as are found in FIG. 2 designated as prior art in the incorporated-by-reference U.S. Pat. No. 5,198,746.

The quadrature or ±90° phase relationships that exist between the voltages $e_a$, $e_b$, $e_c$ and the respectively associated transmission line currents $i_a$, $i_b$, $i_c$ permits the voltage-source inverter to be solely operated from the storage voltage DC capacitor 55. This is possible because, theoretically, the inverter handles purely reactive power. The GTO thyristors, however, are not entirely lossless, and they cause some of the energy stored in the capacitor 55 to be used up for internal losses. These losses can be supplied from the AC system by making the inverter voltage lag the associated transmission line current by somewhat less than 90°. The inverter then absorbs a small amount of real power from the AC system to replenish these mentioned internal losses and, moreover, keeps the capacitor voltage at the desired level by increasing or decreasing the DC capacitor voltage level. This same loss replenishment control mechanism for making the voltage-source inverter circuit compensating voltage lag the transmission line current by an angle somewhat smaller than 90° may be increased to lag at an angle somewhat greater than 90°. This may be used to control the amplitude or magnitude of the AC output voltage for increased or decreased compensation. Zero inverter voltage corresponds to the situation when the compensation is zero and zero reactive impedance is injected into the transmission line.

The most intriguing portion of the controlled voltage-source inverter is the inverter control circuit 60 which controls the magnitude and the phase position of the inserted voltages in order to provide series compensation for the transmission line system. The measurement and analysis of various transmission line system parameters, including line voltages, line currents, operating frequency, and machine rotational velocity are fundamental to carrying out the control of the compensation "in real time". This also determines the relative success of obviating subsynchronous oscillations by the speed and accuracy and timeliness for the control function to be executed.

An internal control methodology for the series inverter control circuit is based on a mathematical model using instantaneous vectors for the three-phase voltage and current sets on the AC or transmission-line side of the inverter.

Figure 2:
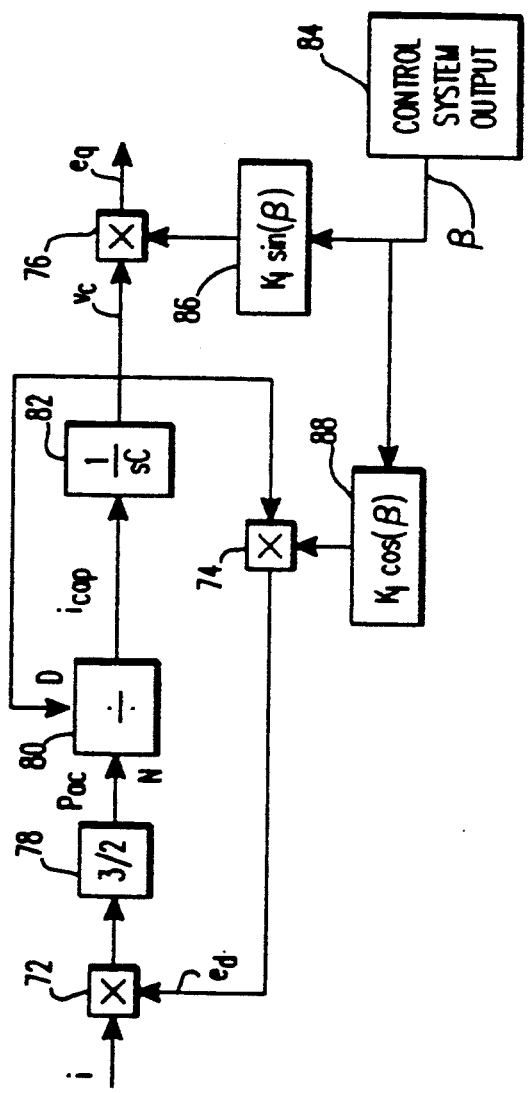
FIG. 2 is a control flow diagram for series compensation for the invention of FIG. 1.

A control flow diagram for series compensation which is shown in FIG. 2, from which an external control interface to internal control may be realized. First consider that in the control flow diagram of FIG. 3, a single vector current $i_{dqs}$ is regarded as representative of the transposed transmission line currents. This current vector is input to a first signal multiplier function 72 along with a feedback signal representative of a real component of a series voltage vector or $e_d$, as this voltage vector $e_d$ is seen to be a function of a control system output angle beta ($\beta$) which is an output of the control system output block 84. The control system output angle $\beta$ is a dynamic measure of how much the injected inverter voltage vector leads the line current vector and, as such, it affects the terminal power Pac. This is done through the real component of the series voltage vector $e_d$ with the cosine $\beta$ function block 88. The cosine $\beta$ function block 88 also introduces a proportionality constant $K_I$ which defines the ratio between the DC capacitor voltage determining the magnitude of a series AC voltage $v_c$ and the peak phase voltage on the AC side of the inverter.

The forward signal path through the first signal multiplier function 72 for the product of $i_{dqs}$ and $e_d$ is output through a scaler adjustment ratio block 78 which outputs 3/2 times the terminal power function Pac which enters a division function block 80 at reference point N. This block 80 has a divisor reference point D in feedback from the magnitude of the series AC voltage $v_c$. This signal $v_c$ also is sent back through the feedback signal multiplier function 74 along with the output of the control angle $\beta$ system output cosine function in order to form the real component of the series voltage vector $e_d$. The division of the reference point signals $N/D = P_{ac}/v_c$ provides an output current $i_{cap}$ which is the instantaneous capacitor current which is proportioned to the power on the DC side of the voltage-source inverter when it is integrated in the capacitor. When $i_{cap}$ passes through the integrator function block 82 with a function 1/sC, a voltage $v_c$ results, where s in the denominator is the function operator or transformation for integration. The variable $v_c$ is thus the instantaneous capacitor voltage, since the current is integrated by the capacitor bringing about a change in the DC capacitor voltage. Thus $v_c$ directly determines the value of the series AC voltages $e_a$, $e_b$, $e_c$.

The output signal $e_q$ from the output signal multiplier function 76 is for the product of the instantaneous capacitor voltage $v_c$ and the output of the control angle $\beta$ system output sine function block 86. This results in an instantaneous vector component signal $e_q$ for the AC voltage vector in quadrature (90° phase difference) with the instantaneous line current vector $i_{dqs}$. The control system output angle $\beta$ is used to regulate the magnitude of $e_q$ since it is this angle $\beta$ that can be changed rapidly and arbitrarily as the only control input to the system. In this analysis it has been assumed that the harmonic voltages generated by the voltage-source inverter are neglected, and an instantaneous balance was assumed between the power on the AC-side and DC-side of the inverter. The meaningful result of this representation in the control flow diagram of FIG. 2 is in terms of the ratio of the instantaneous vector component of the AC voltage, which is the reactive component of the series voltage vector $e_q$, divided by the single vector current $i_{dqs}$. This a measure of the instantaneous reactive impedance; the impedance is presented by the voltage-source inverter to the transmission line system according to the equation:

$$Z_{inst} = \frac{e_q}{i_{dqs}} \qquad \text{Eq. (1)}$$

The above analysis also is predicated on the basis that the single vector current $i_{dqs}$ is an independent variable for the transmission line system. The transmission line currents are substantially determined by extraneous factors such as those mentioned hereinabove, now briefly again listed as lightning strikes, fault-bridging events, large loads switched on and off, and an insertion or deletion of some power generators, as well as transmission lines being switched on and off. Since there is an instantaneous balance assumed between the power on the AC-side and DC-side which is defined by the instantaneous capacitor current $i_{cap}$, the control angle $\beta$ must be held to $\pm \pi/2$ on average, with relatively small deviations about this value in order to maintain the required DC voltage.

Controlling Inverter During Fault Current Mode

The invention has been discussed in its various ramifications as a fault current mode surge dissipating and normal mode controllable series compensation system for an electric power transmission line that employs a solid-state inverter such as the voltage-source inverter shown in FIG. 1. It is used primarily, but secondary to this invention, to inject an AC voltage in series with the transmission line in order to cancel the effect of the inductive line impedance or to influence the electrical impedance characteristic of the transmission system in various ways, including dynamically controlling voltage magnitudes and phase angles, in order to increase the power transmitting capacity of the system. It is inherent in the control flow arrangements of FIG. 2 which include the internal control methodology of the invention, that the transmission line current coupled through the transformer coupling arrangements 49a, 49b, 49c of FIG. 1 are reflected through this coupling so that the current flows through the solid-state inverter. The first and second compensating circuit units 51, 53 receive these coupled currents, during periodic switching intervals associated with each of the thyristors or GTOs 52, 56 for the respective phases, along with the inversely poled free-wheeling diodes 54, 58 with their respective path connections thereto.

Upon the occurrence of a short circuit fault on any one or more of the phase transmission line conductors, the short circuit current is coupled back through the voltage-source inverter 50. This current will become extremely high, a reality which cannot be ignored in traditional transformer coupling arrangements for which one or the other of two solutions would be put into practice. Increasing the current rating for the inverter to the maximum fault current contingency may be a practicable solution, but it is expensive to implement. Another solution which is dedicated to the same concern is providing a separate bypass switch to carry the fault current. Neither of these solutions circumvent the need for careful design engineering, costly manufacture, and meeting maintenance requirements.

The present invention, while using voltage-source inverter series compensation with transformers coupled into the transmission line of an electric power system, implements a solution to the problem of fault line current through the coupling transformers. This is done without creating a high rating need for the inverter so as to be unnecessarily high or requiring the provision of high voltage separate bypass switches to carry a fault current. The present invention solves the fault current dissipation problem by using all the conductors of the actual inverter by switching all of the solid-state switches or thyristors in both the first and second compensating circuit units 51, 53 to a concurrent and continuously switched-on position. The continuous conduction of switches instead of being switched individually in a harmonious synchronism, as in the switching harmony for normal operation, is more appropriate for the fault mode of operation when excessive currents are present in the inverter which may be a voltage-source inverter. The continuous conduction of all the GTOs 52a–52c and 56a–56c can thus pass the currents which become several times higher during a fault mode of operation as compared with the normal mode of operation. The switching of the inverter poles or pole-output voltage connections for each end of the transformer winding 70c alternate during normal mode operation, sequentially over 120 electrical degrees or ⅓ of an operating periodic cycle at for example 60 Hz. This normally produces a set of output voltage waveforms as characteristically represented and mentioned hereinabove.

Figure 4A:
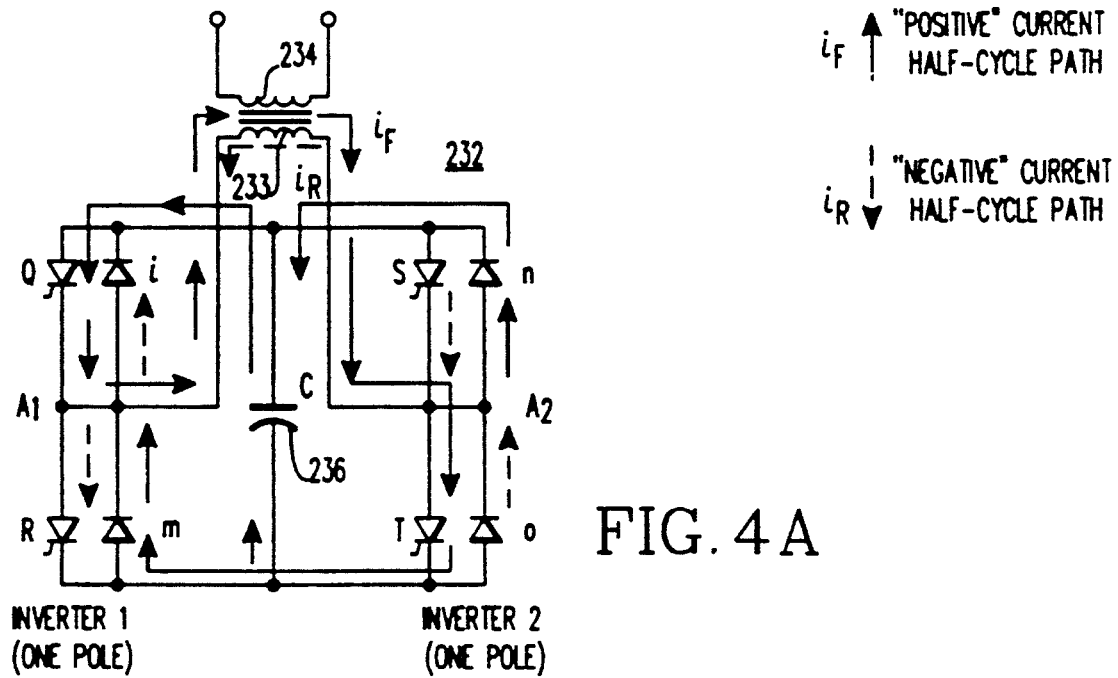

The drawing in FIG. 4A is an isolated pair of phase poles, which may be for any one of the phases A, B, C. The similarly phase-paired poles are A1 with A2, B1 with B2 or C1 with C2 in the voltage-source inverter 50 of FIG. 2. The isolated pole-pair for any phase is generally referenced 232, although it will be assumed that this is for the paired inverter output poles A1 with A2 as shown on the left and right of DC capacitor 236. The positive and negative current half-cycle paths are represented by solid and dashed current lines respectively, and these are also designated by $i_F$ and $i_R$ which pass through the coupling transformer inverter-coupling winding 233 of a compensating transformer 234. The transformer windings are likewise generally alphabetically reference-numbered rather than to be regarded as the specific transformer for any one of the phases which it may represent.

Alternate cycles of operation for the normal mode ensures that the pulsating current through the transformer winding 233, as reflected through the coupling transformer 234 to the transmission line, is the appropriate reactive component of voltage in order to provide the series compensation. Transmission line voltage and current measurements are reflected through the external control interface to the internal control according to the control diagram with respect to FIG. 2 described above. The pole voltage A1 is developed between the GTOs 52a, 54a which are here represented by the generic designation Q and R for this pole. The output pole voltage A2 is set between the pair of GTOs S and T, and these respective GTOs are each associated with a parallel reverse poled or free-wheeling diode designated generally as 1, m for Q, R and n, o for S, T.

Figure 4B:
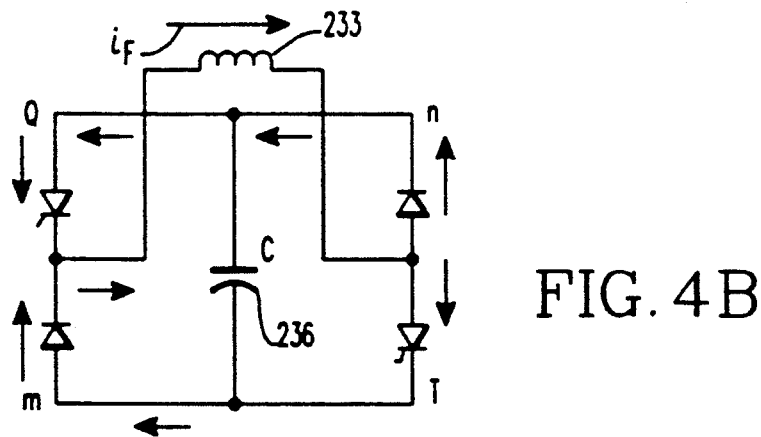
Figure 4C:
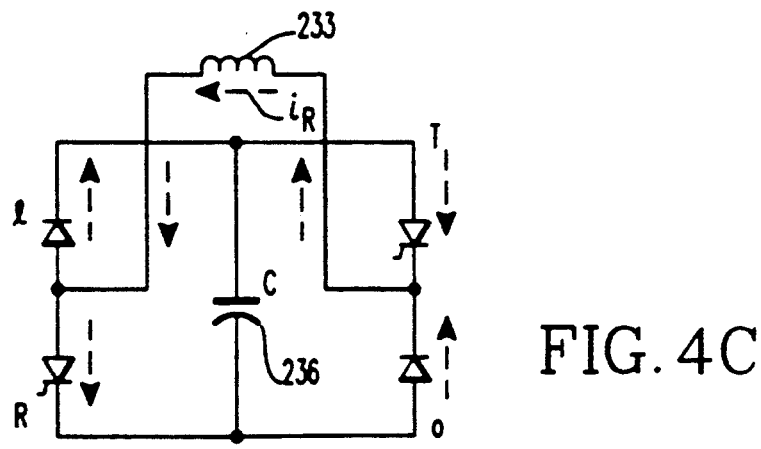

All of the above semiconductor elements are traversed by the positive or negative current half-cycles appropriately designated by the solid current line $i_F$ and the dashed line $i_R$. FIG. 4B is a simplification for the positive current half-cycle path which occurs periodically, and FIG. 4C is likewise a showing for the negative current half-cycle path which alternately govern the flow of current through the transformer winding 233 for the fault mode of operation. All of the GTO switches are turned on simultaneously until the fault has been cleared from the transmission line in any phase or all phases thereof. This indicates that when the normal inverter control operation has been stopped, all of the controllable solid-state switches including the GTO or thyristors in the inverter poles available will double the number of available current paths. All of the switches are kept in conduction as zero voltage for the two parallel current paths comprised of a diode and a GTO thyristor which are in series for each circuit path of the positive and negative fault current half-cycles.

Figure 3:
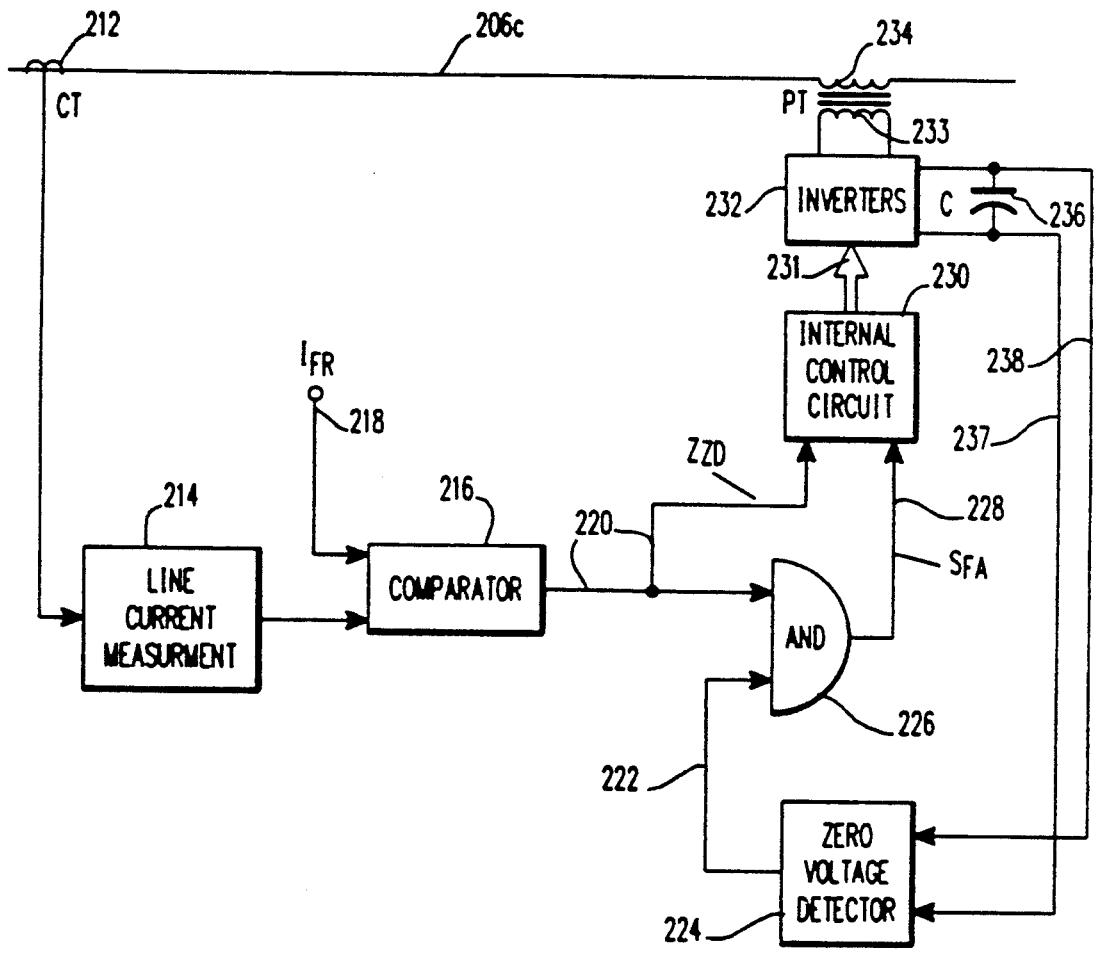
FIG. 3 is a block diagram of a control arrangement for controlling a voltage source inverter of FIG. 2 during a fault current mode in order to double the maximum current carrying capability of the inverter according to the invention; and, FIGS. 4A,B,C are respective circuit representations of one phase of the voltage source inverter of FIG. 1, when operated with the control arrangement of FIG. 3 under fault conditions.

A preferred control arrangement to achieve this fault mode operation is shown in FIG. 3. Implementing the above-described operation is prefaced by first discharging the DC storage capacitor 236 which is done during the normal control mode when a fault occurs on the transmission line. Thereafter turning on all of the switches or GTOs and keeping them in a switched-on condition during the alternatively occurring positive and negative current half-cycles is done next in the two compensating circuit units 51, 53 of FIG. 1 or as shown simplified in FIGS. 4A,B,C for one of the output phases. The control circuit block diagram for controlling the voltage-source inverter during a fault current mode includes the circuit block 230 designated "internal control" which has been described with respect to FIG. 2. The magnitude of the transmission line current 206c is coupled through a current transformer 212 for measurement by block circuit 214. The circuit 214 includes a rectifier and filter circuit so that an average value of transmission line current is input to a fault current comparator 216 which has another input connected at 218 to a predetermined fault current $I_{FR}$ reference level value. When the magnitude of the measured transmission line current exceeds the current $I_{FR}$ during a fault, a zero voltage and thereby a zero impedance signal to indicate a fault is output on line 220 as signal $Z_{ZD}$. This signal is provided on line 220 to the reference input of the normal internal control circuit block 230.

Once the fault current is detected, compared and goes to the internal control 230, the switching pattern on output lines 231 causes the normal inverter control 230 to reduce the voltage on the inverter DC storage capacitor 236 to zero. This voltage is monitored on a zero voltage detector circuit 224 which includes a comparator output on line 222 and this forms one input to an AND logic circuit 226 which responds when the voltage detected across the capacitor 236 goes to zero. The other input to the AND circuit 226 is on line 220 which connects the zero impedance demand signal $Z_{ZD}$ from the fault current comparator 216.

Assuming the fault is present, a signal $S_{FA}$ is output from the AND circuit 226 to gate all of the GTO thyristors to be switched-on through the action of the internal control circuit 230 on the switching gate lines 231. With the inverter circuit 232 switched-on, all three phases of the GTOs are as described with respect to FIGS. 4A,B,C. Once the fault condition has been cleared, the GTO demand signal $Z_{ZD}$ is removed from the AND circuit 226 on line 220 so that this gate is closed. The inverters 232 go back to a normal mode of operation in order to satisfy a recovery compensation action of the series compensated transmission line system.

While the present invention has been described with respect to a particular physical embodiment, the invention is not limited to the particulars described above; instead, the scope of the invention is defined by the following claims.

What is claimed is:

1. A transmission line fault current surge passing system for dynamically passing fault current, said system comprising:
   compensating means coupled in series with the transmission line and being adapted to bypass fault current coupled from the transmission line and thereafter to introduce or to inject therein a voltage component;
   control means for interactively adjusting said compensating means to accept fault current during transitions from a normal operating mode, means for sensing said compensating means to dissipate a fault current surge;
   said control means switching said compensating means to the fault mode for so long as to pass the fault current.

2. The fault current passing system as set forth in claim 1, wherein said compensating means includes means for minimizing transmission fault current by measuring the magnitude of the line current to determine if it exceeds first or second predetermined levels.

3. The fault current passing system of claim 2, wherein upon achieving a first precondition, said minimizing means selectively controllably injecting a predetermined maximum amount of inductive reactance voltage into the transmission line until the fault has cleared, and upon achieving a second precondition, said minimizing means selectively initiates and maintains fault current surge removal, and then reestablishes controlled compensation for resumed transient and dynamic stability.

4. The fault current passing system of claim 1, wherein said compensating means includes a solid-state switching power converter selected from the class of DC to AC converters known as "voltage-sourced inverters" operated from an energy storage capacitor, said capacitor being discharged immediately preceding fault mode operation.

5. The fault current passing system of claim 4, wherein said solid-state switching power converter includes a plurality of self-commutated GTO semiconductor switches, each of said GTO switches being connected across a parallel shunting circuit including a reverse poled freewheeling diode.

6. The fault current passing system of claim 4, wherein said control means for controlling the injection by said compensation means includes a feedback transmission line current sensor for affecting said control, and said control means controls the magnitude of a phase-quadrature series component output voltage waveform ($e_q$) for transitions to said normal mode.

7. The fault current passing system of claim 6, wherein a phasor voltage quantity affected by a constant multiplier $K_I$ of a control angle parameter $\beta$ determines a real component output voltage waveform ($e_d$) where $\beta$ is the angle by which the inverter voltage vector leads the line current vector, where $K_I$ is the ratio between a DC capacitor voltage and the peak phase voltage on the AC-side of the inverter, and the control angle parameter $\beta$ is arbitrary and rapidly changeable as a primary control input to determine the terminal power ($P_{ac}$) of the transmission system line impedance compensation system.

8. The fault current passing system of claim 4, wherein said solid-state switching power converter includes a plurality of self-commutated GTO semiconductor switches, each of said GTO switches being connected across a parallel shunting circuit including a reverse poled freewheeling diode, and each of said GTO switches capable of being held continuously conductive by said control means under a fault current condition, instead of being switched at a regular rate, for the time period of the fault in order to increase the current carrying capability of said converter.

9. The fault current passing system of claim 1, wherein said compensating means includes a solid-state switching power converter selected from the class of DC to AC converters known as "voltage-sourced inverters" operated from an energy storage capacitor, and having normal and fault current modes of operation with said fault current mode for doubling the maximum normal current carrying capability of said inverter.

10. A transmission line fault current surge passing and impedance compensation system for dynamically bypassing fault current and transitionally balancing a phase-quadrature or reactive voltage component on the transmission line responsive to demand, said system comprising:

compensating means coupled in series with the transmission line and being adapted to bypass fault current coupled from the transmission line and being adapted to introduce or to inject therein a phase-quadrature voltage component, ancillary to the transmission line reactive voltage component for a predetermined operating frequency;

control means for interactively adjusting said compensating means during transitions from a normal operating mode to stabilize the magnitude and phase of a resultant phase-quadrature voltage for the injected voltage component with the transmission line reactive voltage component, substantially in phase quadrature leading or lagging phase angles with respect to transmission line voltage and current parameters, said control means sensing a fault current predetermined condition for bypassing a fault current surge, and switching said compensating means to the fault mode for so long as to pass the fault current during the fault current operating mode;

said fault surge protected and transitionally compensated transmission line having a corresponding adjustment for the real power and reactive power components in order to provide fault current surge protection and transient and dynamic stability without incurring subsynchronous resonance for transitions from fault mode to normal mode operation.

* * * * *